Dec. 24, 1963 J. A. ANDERSON ETAL 3,115,271
METHOD OF CONSTRUCTING A REINFORCED RESIN, CONE-SHAPED
STRUCTURE AND PRODUCT
Filed Aug. 15, 1958 2 Sheets-Sheet 1
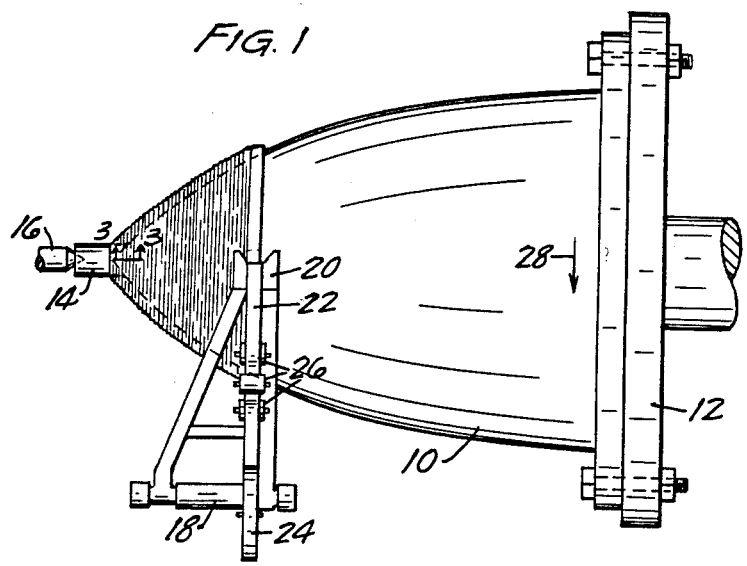
FIG. 1
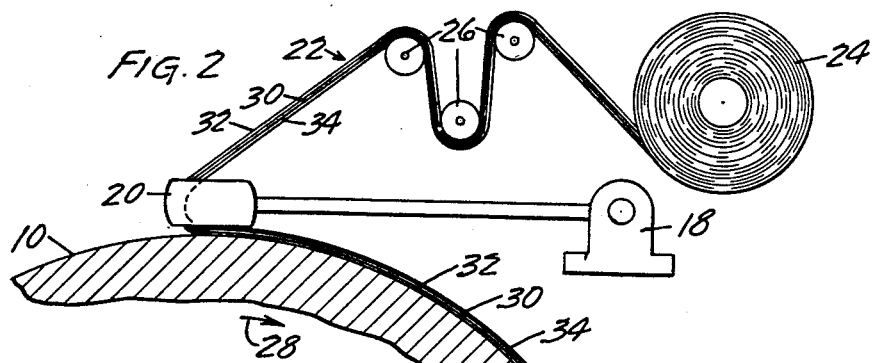
FIG. 2
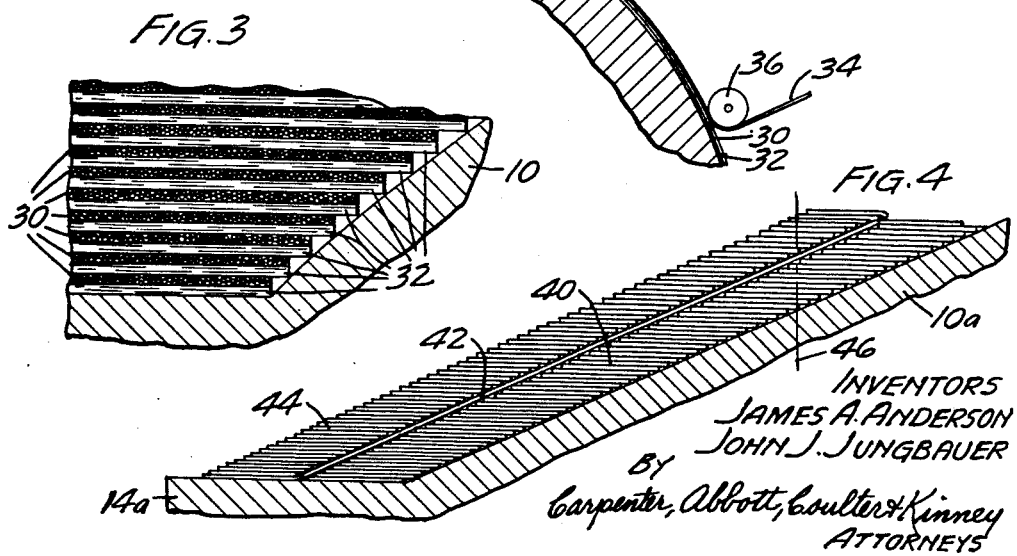
FIG. 3
FIG. 4
INVENTORS
JAMES A. ANDERSON
JOHN J. JUNGBAUER
BY Carpenter, Abbott, Coulter & Kinney
ATTORNEYS Dec. 24, 1963    J. A. ANDERSON ETAL    3,115,271
METHOD OF CONSTRUCTING A REINFORCED RESIN, CONE-SHAPED
STRUCTURE AND PRODUCT
Filed Aug. 15, 1958    2 Sheets-Sheet 2

INVENTORS
JAMES A. ANDERSON
JOHN J. JUNGBAUER
BY Carpenter, Abbott, Coulter & Kinney
ATTORNEYS

United States Patent Office 3,115,271
Patented Dec. 24, 1963

3,115,271
METHOD OF CONSTRUCTING A REIN-
FORCED RESIN, CONE-SHAPED STRUC-
TURE AND PRODUCT
James A. Anderson, Rolling Hills, Calif., and John J.
Jungbauer, St. Paul, Minn., assignors to Minnesota
Mining and Manufacturing Company, St. Paul, Minn.,
a corporation of Delaware
Filed Aug. 15, 1958, Ser. No. 755,338
7 Claims. (Cl. 220—83)

This invention relates to strong, rigid, hollow, self-contained, cone-shaped structures and is particularly concerned with cone-shaped aircraft radomes.

For many years, aircraft radomes have been constructed of resins reinforced with glass fibers, since these offer high strength, light weight, good resistance to weathering, and reasonably good transmissivity of radar frequencies. Some reinforced resin radomes of the prior art are made from chopped fibrous glass, which is blown along with resin against a porous screen until a desired thickness is attained. To the preform thus obtained, additional liquid resin is supplied, and a hard, dense cured shape is formed under heat and pressures usually with matched metal molds. Other prior art radomes are formed on a cone-shaped mandrel by applying a hand layup of pieces of fibrous-glass fabric, holding these in place by loose stitching or by a winding of glass yarn or roving, applying liquid resin, securing additional layers and applying further resin in the same way until a desired thickness is attained, and then applying heat and pressure to cure the resin. For relatively thick sections, the first several layers may be partially cured with heat and pressure before application of further layers, since it is very difficult to work with wet layups in thick sections. Another technique used in the prior art in the manufacture of radomes utilizes fibrous glass woven into seamless, cone-shaped socks. These are drawn one at a time onto a cone-shaped mandrel, and each is sprayed with liquid resin after positioning. Again, application of heat and pressure may be required in stages in building up thick sections.

Each of these and every other prior art technique known to the inventors result in radomes which distort transmitted and received signals to an undesirable extent. A great deal of experimental work has been directed toward correcting this difficulty, but heretofore with limited success.

We have now devised a novel construction for cone-shaped structures, which when used as radomes are characterized by unusually uniform radar transmissivity. The novel process for producing these cone-shaped structures is noteworthy for its adaptability to changes in size, shape and thickness of the cones. Since costs of manufacture are competitive or below those of prior art techniques, our invention has considerable commercial promise in the construction of cones wherein electrical uniformity is not a factor, e.g., in pressure vessels or in missile nose cones not housing radar.

Briefly, the cone-shaped structure of our invention is comprised of a wide, flat strip of non-woven, aligned filaments or fibers, which strip extends spirally about the axis of the structure with each convolution of the strip overlapping the preceding convolution. The widthwise dimension of every portion of the strip extends essentially parallel to the axis of the structure. The fibers are embedded in hard resinous material which bonds the fibers to adjacent fibers in the strip and to fibers of successive convolutions. The novel structure may be constructed using a wide, flat strip of non-woven, longitudinally-aligned fibers impregnated with fusible resin by applying the strip spirally to a cone-shaped mandrel in the direction from the apex toward the base thereof, with each convolution overlapping the preceding convolution and with the overlapped portion of each convolution contacting the surface of the mandrel. The resin is then fused and hardened to provide a rigid, self-contained structure, after which the mandrel may be removed, making it available for construction of a second cone. By a self-contained structure is meant a body which need not be supported and does not depend upon appliances or devices outside of itself for support.

As means for initially supporting the strip material with its widthwise dimension parallel to the axis of the structure, the mandrel may be formed with a coaxial cylindrical projection at its apex, or a cylindrical block may be coaxially secured to the apex. The cylindrical block may subsequently be removed with the mandrel or may become part of the cone-shaped structure. In the latter event, it may be desirable to construct the block of the same material as the wall of the structure.

A preferred construction for cone-shaped aircraft radomes utilizes strip material consisting of two plies of essentially continuous, non-woven, lineally-aligned, un-twisted or lightly twisted, fine glass filaments which are surrounded and exclusively bonded to each other by a restricted amount of a fusible resinous composition. The filaments of one of said plies extend longitudinally, and those of the other of said plies extend laterally of the strip material. The plied strip material is spirally wound on a cone-shaped mandrel having a cylindrical surface at its apex, first around the cylindrical surface and then in overlapping convolutions around the cone-shaped portion. The widthwise dimension of every portion of the strip material extends essentially parallel to the axis of the mandrel, and the overlapped portion of each convolution contacts the surface of the mandrel. Heat and pressure are next applied to cause the resin to flow, forcing out entrapped air and densifying the reinforced resin material. The resin is then hardened to fuse the successive convolutions of the strip material to provide a rigid, self-contained structure, after which the mandrel may be removed for reuse. The cone-shaped structure may be finished on a lathe to a uniform thickness and to provide a smooth exterior. In such preferred structure, the laterally extending filaments of the strip material provide a measure of longitudinal or axial strength which is sufficient for many uses. However, if greater longitudinal strength is desired, one or more layers formed of a plurality of wedge-shaped sections of resin-impregnated, non-woven, continuous glass filaments aligned longitudinally with respect to the structure may be incorporated into its wall. In this event, it may be preferable to omit the ply of laterally-extending filaments from the spirally-wound strip material.

A better understanding of the invention may be gained by reference to the drawing in which:

FIGURE 1 is a schematic view in elevation showing the construction of a cone-shaped structure in the practice of our invention;

FIGURE 2 is a partial end view of FIGURE 1, enlarged to bring out certain details;

FIGURE 3 is a greatly enlarged fragmentary cross sectional view taken along the line 3—3 of FIGURE 1;

FIGURE 4 is a schematic illustration of another cone-shaped structure of our invention, by a cross-sectional view taken along the line 4—4 of FIGURE 5.

Figure 5:
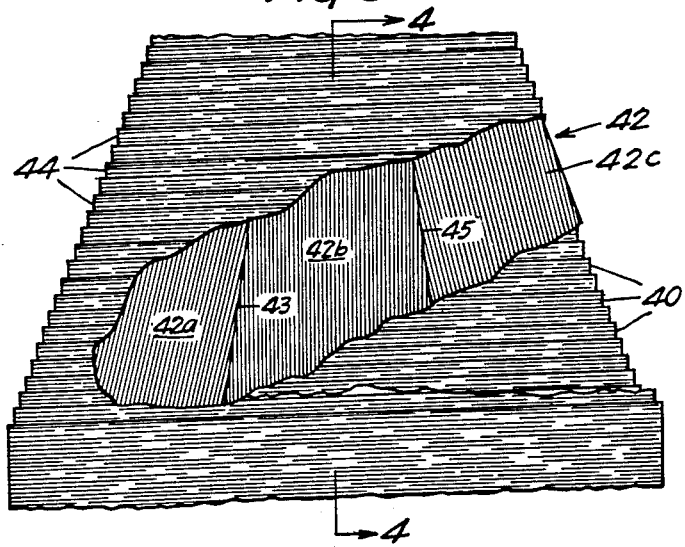
FIGURE 5 is an enlarged side elevation of part of the cone-shaped structure of FIGURE 4 partly broken away to show the arrangement of underlying reinforcement.

Referring first to FIGURE 1, a cone-shaped mandrel 10 is bolted at its base to the face plate 12 of a lathe and is also supported at the cylindrical projection 14 at its apex by the tail stock 16 of the lathe (no other parts of the lathe are shown). Rotatably mounted from a bearing 18, supported by the carriage of the lathe, is a guide 20 for directing resin-impregnated fibrous strip material 22 onto the mandrel 10. Also supported by the lathe carriage are a supply roll 24 of the strip material and tensioning rolls 26. Sufficient braking is applied at supply roll 24 to furnish traction to the tensioning rolls 26.

As the lathe rotates the mandrel 10 in the direction of the arrow 28, the lathe carriage is moved by the lead screw of the lathe toward the face plate 12 at a predetermined variable rate to wind the strip material spirally in overlapping convolutions on the mandrel 10, with the widthwise dimension of every portion of the strip material extending essentially parallel to the axis of the mandrel. As the guide 20 moves along the mandrel 10, the operator may occasionally adjust the hand wheel on the lathe carriage to keep the guide centered approximately as shown in FIGURE 1.

The strip material 22 may consist of two plies 30, 32 (FIGURE 2) of non-woven, lineally-aligned, continuous fine glass filaments which are surrounded and exclusively bonded to each other by a restricted amount of a fusible resinous composition. The filaments of one ply 30 extend longitudinally, and those of the other ply 32 extend laterally of the strip material 22. Removably adhered to the ply 30 is a low-adhesion liner 34, the exterior surface of which is relatively slippery to allow the strip material 22 to slide easily through the guide 20 and to allow the guide to be forced (by means not shown) against the mandrel 10 with sufficient pressure to conform the strip material 22 to the mandrel and to underlying convolutions of the strip material. The liner 34 is then drawn away at roller 36 and discarded or wound up for reuse.

A portion of the cone-shaped object at its apex is schematically illustrated in cross-section in FIGURE 3. The overlapped edge of each successive convolution of the strip material 22 contacts the mandrel 10 so that each convolution is supported by the mandrel in conjunction with the underlying convolution, with its widthwise dimension essentially parallel to the axis of the mandrel. In actuality, the edge of each convolution will conform to some extent to the discontinuity at the end of the underlying layer convolution. However, in a typical case each of plies 30 and 32 may be only about 0.01 inch in thickness, whereas the strip material 22 may be about 0.5 inch in width, so that the effect of this discontinuity is not of great consequence. Upon application of heat and pressure in curing the resin of the strip material 22, the successive convolutions compact to eliminate voids along the mandrel 10 and fuse into an essentially monolithic structure. A strong, rigid, self-contained, cone-shaped structure is thus obtained, which structure is reinforced in the hoop direction by the continuous, spirally-extending filaments of the ply 30 and in the longitudinal or axial direction by the shorter widthwise filaments of the ply 32. After curing of the resin, the exterior of the cone-shaped structure may be machined, e.g., by grinding to provide a uniform thickness and a smooth surface.

FIGURE 4 illustrates schematically in cross-section a cone-shaped structure incorporating additional reinforcement in the axial or longitudinal direction. First, resin-impregnated fibrous strip material is spirally wound on the mandrel 10a and its cylindrical projection 14a in the manner shown in FIGURES 1 and 2 to provide an inner tier 40. This strip material may be the two-plied strip 22 of FIGURE 2 or a single ply of non-woven, lineally aligned filaments extending longitudinally with respect to the strip material and impregnated with fusible thermosetting resin. Over the tier 40 is applied a layer 42 or plurality of layers of essentially continuous, non-woven, lineally-aligned, fine glass filaments which are surrounded and exclusively bonded to each other by a restricted amount of fusible thermosetting resin. The layer 42 is formed of a plurality of wedge-shaped sections cut to fit together in non-overlapping relationship, with the filaments of each section extending longitudinally of the mandrel 10a in conformance with the contour of the cone-shaped structure. Where ease of manufacture dictates, the layer 42 could be pieced together from strips of woven glass cloth, or it could be one or more seamless, cone-shaped socks of woven fibrous glass. Over layer 42 is then applied a second tier 44, similar to tier 40, of spirally laid strip material. Further applications of longitudinal layers and spiral tiers may be made to attain a desired thickness and a desired degree of longitudinal reinforcement, after which the whole is subjected to heat and pressure to cure the resin and provide a dense, essentially monolithic, cone-shaped structure. After removal of the mandrel 10a, the structure is fitted for application, e.g., to an airframe as a radome, by sawing along the line 46 to remove the irregular end section at the desired diameter.

The construction of the cone-shaped structure of FIGURE 4 may be better understood by reference to FIGURE 5 which is a partial side elevation thereof, somewhat enlarged. The outer tier 44 of convolutely wound strip material is broken away to show some of the wedge-shaped sections 42a, 42b, 42c, which comprise the layer 42. These sections were cut and laid up in non-overlapping relationship to provide a butt joint 43 between sections 42a and 42b and a butt joint 45 between sections 42b and 42c. The structure is further broken away to show the inner tier 40.

*Exemplary Fibrous Sheet Material*

Resin-impregnated fibrous sheet material was formed by drawing through a heated bath of epoxy resin and hardener a web formed of a large number of lineally-aligned continuous glass filaments, viz., 195–200 ends or bundles per inch of fibrous glass, continuous filament strand, 60 end, vinyl silane size. Each end or bundle included 204 glass monofilaments of about 0.00038-inch diameter. The epoxy resin consisted of approximately equal parts (1) of a condensation product of epichlorhydrin and bisphenol A, having an epoxide equivalent of about 0.5 per 100 grams of resin and a softening point of about 10° C. as determined by the Durrans' Mercury Method, and (2) the condensation product of 1,1,2,2-tetrakis(4-hydroxyphenyl)ethane and epichlorhydrin having about 3 glycidyl ether groups in the molecule. Admixed therewith was a hardener consisting essentially of isophthalyl dihydrazide to provide a stable, heat-curable composition which adheres well to glass, both before and after curing in contact therewith. The sheet, which comprised about 40 percent resin by weight, was then placed on a low-adhesion carrier liner, and the whole was slit longitudinally to suitable widths and wound into roll form for storage.

This resin-impregnated sheet material typifies material particularly preferred in the practice of our invention. The ratio of glass to resin is readily maintained at high levels of 60:40 or 70:30 by weight or even higher and is controlled within close limits. The high ratios make possible the realization of exceedingly high tensile strengths. Although woven fabrics and webs of randomly intermingled fibers have utility in our invention in providing longitudinal reinforcement, as in layer 42 between the spirally wound tiers 40 and 44 of FIGURE 4, their impregnation with resin within closely controlled limits as to proportion is difficult, and high ratios of glass to resin are not normally attainable.

*Examplary Cone-Shaped Structure*

A metal mandrel of ogive shape and having a cylindrical surface at its apex, was precoated with a solution of a solid high melting silicone which was dried to provide a release coating. Over this was spirally wrapped the above-described exemplary sheet material, slit to a strip ⅜ inch in width with the filaments extending in the longitudinal direction. The lead of wrapping was initially set at 0.030 inch per revolution and adjusted during winding to 0.050 inch per revolution to maintain the strip approximately parallel in its widthwise direction to the axis of the mandrel. Actually, the strip was wound at a lead somewhat less than that theoretically required to maintain the strip material parallel in its widthwise direction to the axis to insure against looseness in the central filaments of the strip.

After applying a first tier of the strip material, a wider sheet of the same material was cut into wedge-shaped sections which were laid up in non-overlapping, abutting relationship to provide a single thickness over the said first tier, with the glass filaments longitudinal of the mandrel. Afer six such plies were laid up consecutively, all with the filaments in the same direction, but with sections offset with respect to sections of the underlying ply, these were covered with porous glass-fiber mat, and a fitted, cone-shaped bag of polyvinyl alcohol film was placed over the mat. The space between the reinforced resin and the bag was evacuated for 15 minutes to force the six plies tightly against the inner tier of strip material. The mat and bag coverings were then removed, and a second tier of spirally-wound strip material was applied in the same manner as the first.

Over this structure was first applied a covering of polytetrafluoroethylene film followed by porous glass-fiber mat and finally by the fitted polyvinyl alcohol bag. With the mandrel standing on its base, the bag was evacuated from its apex and, with the vacuum maintained, the whole was placed in an air-circulating oven for six hours at 275° F. The polytetrafluoroethylene film acted as a release agent to allow removal of the glass mat and vacuum bag for reuse. The rough-surfaced, tough, hard, cone-shaped structure thus produced was turned on a lathe using a diamond-point tool to a uniform thickness of 0.293±0.001 inch.

Three otherwise identical radomes were prepared using essentially the same resinous sheet material except that the Epon 1310 resin was omitted and pyromellitic anhydride was used as the curing agent for the epoxy resin instead of isophthalyl dihydrazide. These four radomes of this invention were tested for electrical properties in comparison to radomes of four prior art constructions to obtain the data reported in Table A. Of the prior art radomes, the sewn sock radome was prepared by sewing together glass fabric into cone-shaped socks, impregnating several socks with liquid polyester resin after positioning them on the mandrel, partially curing these in a vacuum bag, and repeating the process in a total of four stages before completely curing the resin. The mat preform radome was impregnated with polyester resin and cured in matched metal molds at high pressure and temperature. The hand layup of woven glass fabric radome was impregnated with liquid polyester resin, placed in a fitted plastic bag with provision for movement of air between the bag and the radome, and the resin was cured by heat after the bag was evacuated. Each of the radomes was machined to a thickness of one-half wave-length for the particular material of the radome, at a frequency of 9375 megacycles per second. The insertion phase difference was then measured at this frequency by means of a dielectrometer in accordance with established procedures of the aircraft industry. The dielectric constant is noted for each individual radome tested while other values reported in Table A indicate the average for each construction.

TABLE A

| Radome construction | Dielectric constant | Range of dielectric constant | Insertion phase difference |
|---|---|---|---|
| Spiral winding: isophthalyl dihydrazide | 4.35±0.05 | 0.10 | ±0.7° |
| Spiral winding: pyromellitic anhydride | 3.95±0.05<br>3.95±0.05<br>3.95±0.05 | 0.10 | ±0.75° |
| Sewn sock (4-stage) | 4.25±0.11<br>4.13±0.07<br>4.18±0.04 | 0.30 | not tested |
| Mat preform | 3.22±0.13<br>3.33±0.08<br>3.15±0.12<br>3.17±0.07 | 0.38 | ±3.75 |
| Hand layup of woven glass fabric | 3.52±0.15<br>3.56±0.10<br>3.70±0.09 | 0.42 | ±2.5° |

In the evaluation of radomes as to electrical uniformity, the aircraft industry considers chiefly the range of dielectric constant and the insertion phase difference and seeks to hold each of these values to a minimum so as to enable maximum transmission of radar energy and to minimize distortion of transmited signals. The values for each of the four radomes of this invention, as reported in the first two columns of Table A, are exceedingly low and show improvement over the prior art of great significance.

It should be noted that the term "cone-shaped structure" as used herein encompasses true cones as well as ogive and parabolic shapes and structures which may be out of round to match a particular airframe. The structure may be open at its apex for a nose boom or the like, or it may be closed by providing at the apex of the mandrel a cylindrical block which becomes a part of the structure.

In wrapping curved mandrels in the practice of this invention, it is normally preferred to employ means for automatically controlling the lead, e.g., a master pattern, programmed magnetic tape, cams, or the like. Otherwise, the strip material might deviate considerably from the parallel before being noticed by the operator. However, the lead can vary considerably from that theoretically required to maintain the strip material parallel in its widthwise direction to the axis of the mandrel, as long as the lead is not so great as to cause looseness in the central filaments of the strip. In fact, curved shapes are often wound at a constant lead so that the lead eventually is substantially reduced from the theoretical. For example, a portion of a cone theoretically requiring a lead of about 0.042 inch was wound with ⅜-inch strip material at a lead of 0.030 inch, with sufficient tension, i.e., about 100 pounds per inch of width, to compress the underlying convolutions to maintain the strip material essentially parallel in its widthwise direction to the axis of the mandrel. When using wider strip material, deviation from the theoretical lead is possible without encountering wrinkling of the reinforcing filaments.

Since radomes and nose cones may encounter excessively high temperatures, it may be preferred for certain applications to use fibrous matter which is resistant to such temperatures in place of or along with fibrous glass. Among such fibrous matter are quartz fibers, asbestos fibers, aluminum silicate yarn such as "Fiberfrax" yarn of the Carborundum Company, or "Refrasil" yarn of the H. I. Thompson Company. "Refrasil" yarn is a leached-out glass yarn containing more than 98% silica.

Certain organic fibers such as nylon are also promising.

It may be preferred to use thermosetting resins of better temperature resistance such as high temperature phenolics or silicones. Polyester resins have also demonstrated considerable promise for certain applications. Normally, thermoplastic resins are not preferred since these usually are lacking in desired qualities of strength and temperature resistance, but recently thermoplastic resins which are satisfactory in these respects have been made available in limited quantities, and these may have considerable utility in the practice of our invention. For most uses, however, epoxy resins are preferred because of excellent adhesion to glass, excellent mechanical and age-resistant properties, and freedom from shrinkage and evolution of volatiles upon curing. Also, many epoxy resin compositions are stable at room temperatures so that fibrous glass sheet material impregnated therewith may be stored for extended periods before being used in the production of cone-shaped structures in the practice of our invention.

What is claimed is:

1. As a new article of manufacture, a strong, rigid, hollow, cone-shaped structure comprising a continuous wide flat strip extending spirally about the axis of said structure with each convolution of the strip overlapping the preceding convolution and with the widthwise dimension of every portion of the strip extending essentially paralle lot the axis of said structure, said strip comprising non-woven aligned fibers embedded in hard resinous material which bonds the fibers to adjacent fibers in the strip and to fibers of successive convolutions.

2. A cone-shaped structure as defined in claim 1 wherein said fibers are essentially continuous fine glass filaments.

3. A cone-shaped structure as defined in claim 1 wherein said strip consists of two plies, in one of which the fibers extend lengthwise with respect to the strip and in the other of which the fibers extend crosswise with respect to the strip.

4. As a new article of manufacture, a strong, rigid, self-contained, hollow, cone-shaped structure comprising (1) a continuous first wide flat strip of non-woven aligned glass filaments extending spirally about the axis of said structure with each convolution of said strip overlapping the preceding convolution and with the widthwise dimension of every portion of the strip extending essentially parallel to the axis of said structure to provide an inner tier; (2) a layer of glass-filaments over said tier with filaments extending longitudinally of the structure in conformance with its contour and distributed uniformly about the structure; and (3) a continuous second wide flat strip of non-woven aligned glass filaments extending spirally about the axis of said structure with each convolution of said second strip overlapping the preceding convolution and with the widthwise dimension of every portion of the strip extending essentially parallel to the axis of said structure; all of said filaments being embedded in and bonded together into an essentially monolithic structure by hard resinous material.

5. The method of constructing a reinforced resin, cone-shaped structure using a mandrel having a cone-shaped surface and a cylindrical surface coaxial with and intersecting the cone-shaped surface at its apex and using a strip of continuous, thin sheet material of non-woven, aligned fibers which extend lengthwise of the strip and are surrounded and exclusively bonded to each other by a fusible thermosetting resinous composition, comprising the steps of (1) spirally winding said strip around said cylindrical surface and then around said cone-shaped surface with each convolution overlapping the preceding convolution and the overlapped portion of each convolution contacting said cone-shaped surface, the widthwise dimension of every portion of said strip extending essentially parallel to the axis of said object, and (2) fusing and hardening the resin to bond the fibers to adjacent fibers in the strip and to fibers of successive convolutions.

6. The method of constructing a cone-shaped structure as defined in claim 5 wherein said fibers are essentially continuous fine glass filaments.

7. The method of constructing a reinforced resin, cone-shaped structure using a mandrel having a cone-shaped surface and a cylindrical surface coaxial with and intersecting the cone-shaped surface at its apex and using strips of continuous, thin sheet material of non-woven, aligned, essentially continuous fine glass filaments which extend lengthwise of the strips and are surrounded and exclusively bonded to each other by a fusible thermosetting resinous composition, comprising the steps of (1) spirally winding one of said strips around said cylindrical surface and then around said cone-shaped surface with each convolution overlapping the preceding convolution and the overlapped portion of each convolution contacting said cone-shaped surface to provide an inner tier of filaments wherein the widthwise dimension of every portion of said strip extending essentially parallel to the axis of the mandrel, (2) applying over said inner tier at least one layer of wedge-shaped segments of said sheet material in non-overlapping, abutting relationship with the filaments extending longitudinally of the mandrel in conformance with its general contour, (3) spirally winding another of said strips over said layer starting at the cylindrical portion of the mandrel with each convolution overlapping the preceding convolution and the overlapped portion of each convolution contacting said underlying layer, the widthwise dimension of every portion of this strip extending essentially parallel to the axis of the mandrel, (4) fusing and hardening the resin to bond together all of the filaments into an essentially monolithic structure, and (5) removing the mandrel.

References Cited in the file of this patent

UNITED STATES PATENTS

| | | |
|---|---|---|
| 2,417,586 | Crosley | Mar. 18, 1947 |
| 2,467,999 | Stephens | Apr. 19, 1949 |
| 2,519,069 | Roberts | Aug. 15, 1950 |
| 2,539,404 | Crutchfield et al. | Jan. 30, 1951 |
| 2,594,693 | Smith | Apr. 29, 1952 |
| 2,744,043 | Ramberg | May 1, 1956 |
| 2,762,419 | Prewitt | Sept. 11, 1956 |
| 2,791,241 | Reed | May 7, 1957 |
| 2,843,153 | Young | July 15, 1958 |
| 2,905,578 | Rees et al. | Sept. 22, 1959 |
| 2,969,812 | De Ganahl | Jan. 31, 1961 |
| 3,023,135 | Wiltshire | Feb. 27, 1962 |

FOREIGN PATENTS

| | | |
|---|---|---|
| 126,945 | Switzerland | July 16, 1928 |